United States Patent
Nelson et al.

(10) Patent No.: US 6,175,954 B1
(45) Date of Patent: *Jan. 16, 2001

(54) COMPUTER PROGRAMMING USING TANGIBLE USER INTERFACE WHERE PHYSICAL ICONS (PHICONS) INDICATE: BEGINNING AND END OF STATEMENTS AND PROGRAM CONSTRUCTS; STATEMENTS GENERATED WITH RE-PROGRAMMABLE PHICONS AND STORED

(75) Inventors: Lester David Nelson, Santa Clara; Lia Adams, Palo Alto, both of CA (US)

(73) Assignees: Fuji Xerox Co., Ltd., Tokyo (JP); Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/961,020

(22) Filed: Oct. 30, 1997

(51) Int. Cl.[7] ............................................. G06F 9/44
(52) U.S. Cl. ............................ 717/2; 717/7; 717/8; 717/1
(58) Field of Search ........................... 395/701, 702, 395/703; 345/156, 358; 717/1, 2, 7, 8

(56) References Cited

U.S. PATENT DOCUMENTS

| | | | | |
|---|---|---|---|---|
| 5,287,502 | * | 2/1994 | Kaneko | 707/4 |
| 5,398,313 | * | 3/1995 | Kojima et al. | 395/702 |
| 5,436,639 | * | 7/1995 | Arai et al. | 345/156 |
| 5,517,663 | | 5/1996 | Kahn . | |
| 5,638,060 | * | 6/1997 | Kataoka et al. | 341/20 |
| 5,704,836 | * | 1/1998 | Norton et al. | 463/36 |
| 5,732,227 | * | 3/1998 | Kuzunuki et al. | 345/333 |
| 5,796,386 | * | 8/1998 | Lipscomb et al. | 345/156 |
| 5,822,587 | * | 10/1998 | McDonald et al. | 395/702 |
| 5,917,490 | * | 6/1999 | Kuzunuki et al. | 345/351 |

OTHER PUBLICATIONS

Hiroshi Ishii and Brygg Ullmer, Tangible Bits: Towards Seamless Interfaces Between People, Bits and Atoms, Conference on Human Factors in Computing Systems (CHI 97), Mar. 22–27, 1997, retrieved from Worldwide Web Site http://tangible.www.media.mit.edu.

Ken Kahn, Seeing Systolic Computations in a Video Game World, IEEE Conference on Visual Language, Proceedings, pp. 95–101; Sep. 1996 (Kahn 1).

Ken Kahn, Seeing Systolic Computations in a Video Game World, paper submitted to IEEE Conference on Visual Languages '96 on Feb. 12, 1996, retrieved from Worldwide Web Site http://www.toontalk.com (Kahn 2).

Various pages retrieved on Aug. 21, 1997 from the Toon Talk Worldwide Web site at http://www.toontalk.com/English/.

(List continued on next page.)

*Primary Examiner*—Tariq R. Hafiz
*Assistant Examiner*—Todd Ingberg
(74) *Attorney, Agent, or Firm*—Oliff & Berridge, PLC

(57) ABSTRACT

Tangible computing is the manipulation of real, physical objects to instruct and control computers. Computer programs can be created by manipulating physical objects that represent program language elements of a program or programming language. A tangible computing system calls for observation by a computer of a real, three-dimensional work space, where each physical object can be assigned a program language element. Assignment of attributes to, and/or movement of each real physical object results in the creation of a new program component. In this manner, a user can manipulate real, physical objects to create programs. Thus, the real world itself becomes a human-computer interface that allows a user to create programs and control digital processes.

25 Claims, 6 Drawing Sheets

OTHER PUBLICATIONS

Various pages retrieved on Aug. 21, 1997 from the MIT Epistemology & Learning Group World Wide Web Site at http://el.www.media.mit.edu/groups/el/projects.

IBM Dictionary of Computing pp. 607,608,670, Dec. 1994.*

Ullmer, B.; Ishii, H.; "The MetaDESK; Models and Prototypes for Tangible User Interfaces"; Proceedings of the 10th Annual Symposium on User Interface Software and Technology; pp. 223–232, Oct. 1997.*

Rauterberg, M.; Bichsel, M.; Meier, M.; Fjeld, M.; "A Gesture Based Interaction Technique for a Planning Tool for Construction and Design"; Proceedings of the 6th IEEE International Workshop on Robot and Human Communication; pp. 212–217, Sep. 1997.*

Fitzmaurice, G.; Buxton, W.;p "An Empirical Evaluation of Graspable User Interfaces: Towards Specialized, Space–Mutliplexed Input"; Proceedings of the 1997 Conference on Human Factors in Computing Systems: pp. 43–50, Mar. 1997.*

Rauterberg, M.; Mauch, T.; Stebler, R.; "The Digital Playing Desk: A Case Study for Augmented Reality"; Proceedings of the 5th IEEE International Workshop on Robot and Human Communication; pp. 410–415, Nov. 1996.*

Kahn, K.; "Drawing on Napkins, Video–Game Animation, and Other Ways to Program Computers"; Communications of the ACM; vol. 39, No. 8, pp. 49–59, Aug. 1996.*

Suzuki, H.; Kato H.; "Interaction–Level Support for Collaborative Learning: AlgoBlock—An Open Programming Language", Proceedings of the Conference on Computer Support for Collaborative Learning: 12 pages, Oct. 1995.*

Wellner, P.; "The DigitalDesk Calculator: Tangible Manipulation on a Desk Top Display"; Procedings of the ACM Symposium on User Interface Software and Technology; pp. 27–33, Nov. 1991.*

McIntyre, David Withey "A Visual Method for Generating Iconic Programming Environments", UMI Dissertation Services, Aug. 1992.*

George W. Fitzmaurice, Hiroshii Ishii and William Buxton, "Bricks: Laying the Foundations for Graspable User Interfaces", CHI 95 Conference proceedings on Human Factors in computing systems, pp. 442–449, 1995.*

* cited by examiner

COMPUTER PROGRAMMING USING TANGIBLE USER INTERFACE WHERE PHYSICAL ICONS (PHICONS) INDICATE: BEGINNING AND END OF STATEMENTS AND PROGRAM CONSTRUCTS; STATEMENTS GENERATED WITH RE-PROGRAMMABLE PHICONS AND STORED

BACKGROUND OF THE INVENTION

1. Field of Invention

This invention relates generally to tangible computing, and more particularly to the creation of computer programs by manipulating physical objects that represent program language elements of a program or programming language. The basic functions of the tangible computing system call for observation by a computer of a real, three-dimensional work space, where each physical object can be assigned a program language element, and assignment of attributes to, and/or movement of, each object results in a new program component.

2. Description of Related Art

Human computer interface (HCI) has evolved from the historical human interaction with machine by way of levers and buttons to the present-day keyboard, mouse and graphic display. However, interactions between people and computer programs are generally confined to graphical user interface (GUI) applications on desktop computers. The essence of a GUI is the metaphor—or icon—depicting a real world application in a virtual environment. Thus, GUI solutions take advantage of realistic metaphors.

Ubiquitous computing is an approach to computing where many computers are available throughout a physical environment, while being unnoticed to the user. This type of computing, however, is characterized by exporting a GUI-style interaction metaphor to large and small computer terminals situated in the user's physical environment.

"Augmented reality," or "computer-augmented environments," is another approach to computing which attempts to integrate real and computational media. For example, physical documents can be moved with digital documents using a video projection of computer display onto a real desk with physical documents.

"Passive real-world interface props" have also been developed, where a user is given physical props as a mechanism for manipulating three-dimensional models within a traditional computer screen.

With the advent of virtual reality, haptic interfaces were developed to allow a user to move his hand and interact with virtual components within a virtual environment.

A newer type of HCI is called "tangible user interfaces" (TUIs), which augments the physical world by coupling digital information to everyday physical objects and environments. For example, a flat-panel display is a physically instantiated window which allows haptic interaction with three-dimensional digital information bound to physical objects. Thus in TUI, physical objects replace virtual icons, and manipulation of the physical objects represent what is occurring in the virtual world.

Other systems using direct manipulation programs include "ToonTalk," which permits programs to be constructed by user manipulation of graphic representations of physical objects, all within a virtual environment.

SUMMARY OF THE INVENTION

This invention provides a system which overcomes the limitations of the virtual environment when creating and generating programs, discussed above.

This invention further provides a system that allows computer interaction to create programs and digital artifacts that have embedded programs.

In the tangible computing system of this invention, users manipulate selected physical objects to create and control programs and other digital constructions thus creating unrestricted programs for general purposes.

This invention provides a tangible computing system that observes, understands, and reacts to manipulations of a set of objects in a work space by one or more users. The people, places, and things in the work space, or more generally, the place of interest, must be observable at least to the extent that a specific set of motions on a particular set of objects can be communicated to a computer or a network of computers. The minimum level of understanding required of the system for tangible computing may be expressed as the ability to recognize a tangible language and trigger the appropriate action when the observed input is correct or errors are detected. Actions may include the generation of other digital constructions, for example, compilation, interpretation or translation, generation of control events for an active application, for example, a user interface, and generation of error messages or corrective actions for error conditions.

This invention also provides a tangible programming language used to prepare code from the real representations. The tangible programming language of this invention represents data as a set of tangible data objects that can be picked up from a location under observation, dropped, and used to invoke operations on other data objects by gestures made with or applied to the object. Such gestures include, for example, touching objects together.

The tangible programming language of this invention also provides for external operations, including saving programs in a memory and restoring programs from the memory, and inputting and outputting data values.

In the tangible computing system of this invention, the system observes or senses what is being done to objects in the work space, interprets these actions as meaningful steps in the work at hand, and updates the state of the system as a result of these actions. In the tangible computing system of this invention, users are given better control over their computational needs. The concreteness of the tangible objects permits a group of users to interact in a natural way with the tangible programming language elements.

Other aspects of the invention will become apparent from the following more detailed description, taken in conjunction with the accompanying drawings.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
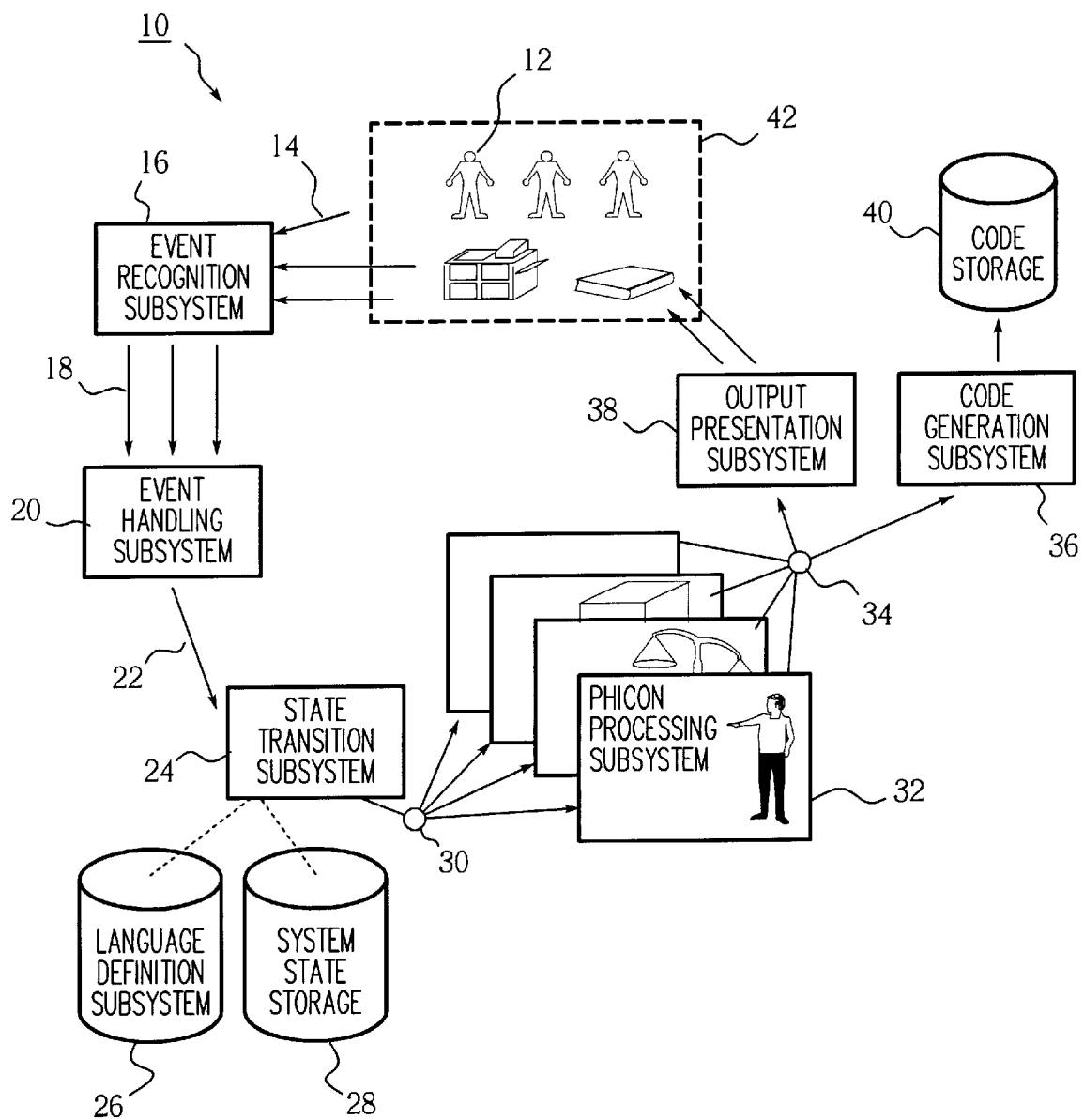
FIG. 1 is a diagram of a tangible computing system of this invention.

FIG. 1 shows one preferred embodiment of the tangible computing system 10 of this invention. As shown in FIG. 1, real, three-dimensional physical objects, or phicons 12, can be assigned a program language element, and assigning an attribute to each phicon 12 results in a new program component or event 14. Each program component or event 14 is recognized by an event recognition subsystem 16 of the tangible computing system 10. The recognized events 14 are communicated by an event stream 18 to an event handling subsystem 20. Each event 14 is placed in a queue 22. The events 14 are sequentially pulled from the queue 22 by a state transition subsystem 24. The state transition subsystem 24 determines if a state transition has occurred. A language definition subsystem 26 and a system state storage subsystem 28 are accessed by the state transition subsystem 24 to determine the system state. Processing updates 30 occur by processing the event 14 of a phicon 12 at a phicon processing subsystem 32. Internal software representations 34 of the events 14 are then used by code generation subsystem 36 to generate programming code which is stored in code storage subsystem 40. Additionally, internal software representations 34 of the events 14 are used by an output presentation subsystem 38 for external representations of the events 14. The output presentation subsystem 38 may be standard graphics presentation on a screen (not shown). Code generated by the code generation subsystem 36 which is stored in the code storage subsystem 40 may be in the form of source code, object code or other compilable or executable program language.

Tangible computing is realized by 1) observing the objects 12 of interest and inferring the users' actions, 2) observing the users and inferring the objects 12 involved, or 3) a combination of the two approaches. The objects 12 may actively participate in the observation by, for example, transmitting a signal. The objects 12 may passively participate in the observation, for example, through object analysis of video images. The observations needed for tangible computing include 1) identifying the objects 12 being manipulated, 2) locating the objects 12, and 3) determining the events 14 associated with the objects 12. Determining the event(s) 14 includes, for example, what is being done to the object 12 or what objects 12 are being used in what combination. Real objects 12 are used to represent portions of a computation. The system 10 observes actions made by a user when using these real objects 12 to build the intended digital representations. The set of objects 12 and actions used forms a precise "body language" for expressing designs or intent.

For example, a user can take actual pieces of hardware found in electrical or mechanical devices to specify instructions for different assemblies of those parts or device repair. A physical model of a geographic region or building may be used to control the navigation through data pertinent to the people, places, and things represented by the physical model. A physical model of people, places, and things may be used to create a narration of an event or possible event, for example animation, cartoon, screenplay or process description. A physical representation of a logistical situation, for example, inventory control, production flow, or tactical position may be used to permit a group of people to reason about a complex procedure or course of action and then document the procedure or course of action using the representation.

Initially recognizing an object 12 may be accomplished in various ways. For example, a user may identify an object 12 by touching a pre-assigned location corresponding to an identity the user wishes to assign to the object. Similarly, a physical switch-based observation system may be used. Another versatile observation mechanism is virtual observation, where a camera 162 observes passive objects in the work space. The size and configuration of the observation area may be changed by adjusting the field of view or the granularity of resolution of the camera 162.

Visual observation of tangible computing events may also involve using color to distinguish the kind of physical icon (phicon) 12 being introduced into the work space. For example, each phicon 12 may be attached to a larger circle of pre-selected colors. The set of colors cover the range of possible kinds of types of phicon 12, such as block, figure, etc. Looking for contiguous regions where one predefined color predominates permits initial recognition of an object 12. The system 10 may use other visual techniques for identifying objects by distinguishing various features, including bar codes and data glyphs.

The tangible computing system 10 can continuously recognize the objects' identities or can remember the objects' identities as part of the system state. With continuous recognition, the object 12 transmits a recognition signal or is passively sensed by the event recognition subsystem 16 during each event 14 in which it is involved. System state information may be used to keep track of what objects 12 are involved in each event 14 without actually being observed by the event recognition subsystem 16.

Data structures include sets of physically adjacently-located objects 12. One or more designated comparison objects 12 operate on a set of data to perform a conditional logic test, for example "greater than," "less than," or "greater than or equal to," and invoke an appropriate action based on the results of the test. A comparison object 12 may be invoked by gesture, for example, by touching the object 12 to perform the test and invoke the actions. One or more iteration objects 12 iterate along the elements of a data structure or iterate by counting to or from a given number. A training phase allows a set of tangible language actions to be learned, associated with an iteration object 12, and applied during each iteration when the iteration object is invoked. An iteration object 12 may be invoked by a gesture, for example, touching the object, to perform its learned operations on a data structure. A set of learned actions may also be associated with an object 12 to provide a mechanism for encapsulating complex behavior. Thus, in tangible programming, data is represented by a set of tangible data objects 12 that can be picked up from a location under observation, moved, and used to invoke operations on other data by gestures made with or applied to the objects 12. In this manner, user manipulation of phicons 12 represents objects and any associated representation from which to program.

Figure 2:
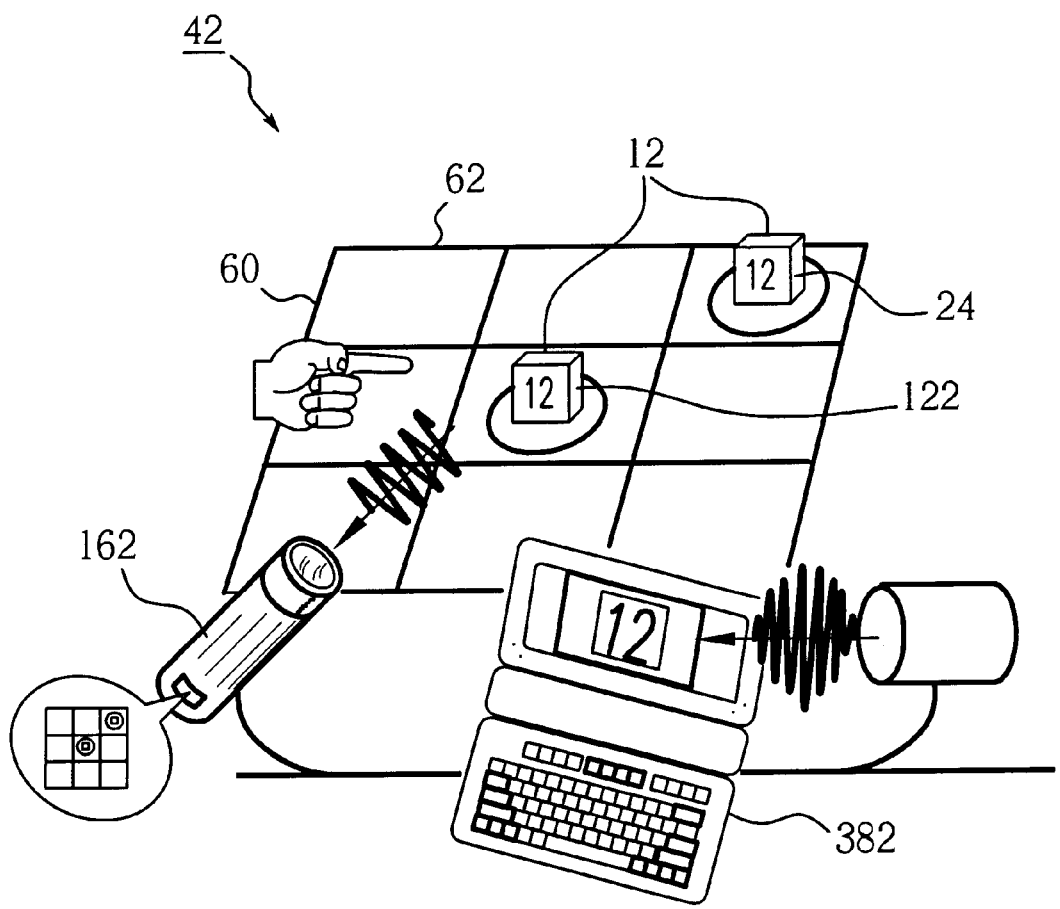
FIG. 2 shows the elements of a visual tangible interface.

As shown in FIG. 2, observing the location of a phicon 12 within the work space 42 requires identifying a coordinate system, or grid, 60. Since a phicon 12 occupies space, the size of the cells 62 of the grid 60 may be defined so that a phicon 12 takes up one location, or many locations, on the grid 60. The coordinate systems may also be layered. As shown in FIG. 2, a camera 162 of the event recognition subsystem 16 observes a number of visually enhanced phicons 12 on the grid 60. The visually enhanced phicons 12 carry observable labels indicating their attributes, such as the "12" data phicon 122, which carries a value of 12, or the combined data/operator phicon 124, which carries a "divide by two" operation. The camera 162 transmits an image of the work space 42, including the phicons 12, to the event recognition subsystem 16 of the tangible computing system 10, which processes the image to display, for example, an image of the data "12" of the data phicon 122 on a display 382 of the output presentation subsystem 38.

Table 1 outlines the classes of actions a user may apply to one or more phicons 12 in the tangible computing system 10. For example, a user may change an orientation of a phicon 12, such as by flipping, spinning or turning the phicon 12. The tangible computing subsystem 10 observes this action, and based on the state and attributes of the phicon 12 and the action, generates a programming event.

In the preferred embodiment, the tangible programming methods of this invention enable users/programmers to interactively manipulate user-selected phicons 12 to create programs. Data is represented by a set of tangible data phicons 12 that can be picked up from an observable location in the work space 42 and dropped at another observable location in the work space 42, and used to invoke operations on other data phicons 12 by gestures made with or applied to the phicons 12. Such gestures include, for example, touching objects 12 together. Data structures include sets of physically grouped phicons 12, and can further include how the phicons 12 within a set are placed relative to each other. A comparison phicon 12 operates on a set of data phicons 12 to perform a conditional logic test. Such tests include, for example, "greater than" or "greater than or equal to", the comparison phicons 12 invoking appropriate actions based on the tests. A comparison phicon 12 may be invoked by a gesture to perform its test and invoked actions. Such gestures include, for example, touching the comparison phicon 12 to the data phicon 12. An iteration phicon 12 iterates along the elements of a data structure or by counting to or from a given number. A training phase allows a set of tangible language actions to be learned, associated with the iteration object 12, and applied during each iteration once the iteration object 12 is invoked. An iteration object 12 may be invoked by gesture to perform its learned operations on a data structure. For example, touching the iteration object 12 to the data object 12 performs learned operations on a data structure. A set of learned actions may also be associated with an object 12 to provide a mechanism for encapsulating complex behavior. Such a procedural object 12 may be invoked by gesture to perform its learned operations on a data structure. For example, touching the procedural object 12 to the data object 12. One or more control objects 12 control the training phase for learned actions. Touching a control object 12 stops a training session. Touching the control object 12 to another object 12 with learned behavior causes the learned actions to be discarded, allowing the touched object 12 to be retrained. The tangible programming language of this invention also provides for external operations, including saving programs to a memory and restoring programs from memory, as well as inputting and outputting data values.

Figure 3:
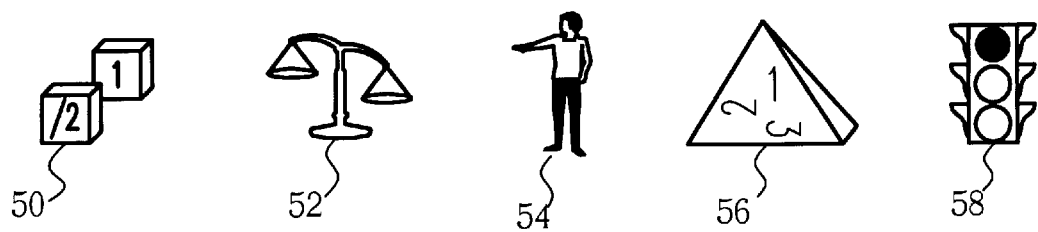
FIG. 3 shows various physical objects used for programming.

Thus, programs may be created by observed actions performed upon the various type of phicons 12. An interpreter designed for the tangible language executes the tangible program, and these programs can be saved, retrieved, edited, and re-executed using the tangible interface. FIG. 3 shows these various types of tangible phicons 12 used to construct programs. Table 2 lists the phicons 12 shown in FIG. 4 along with their representation and operations.

Figure 4:
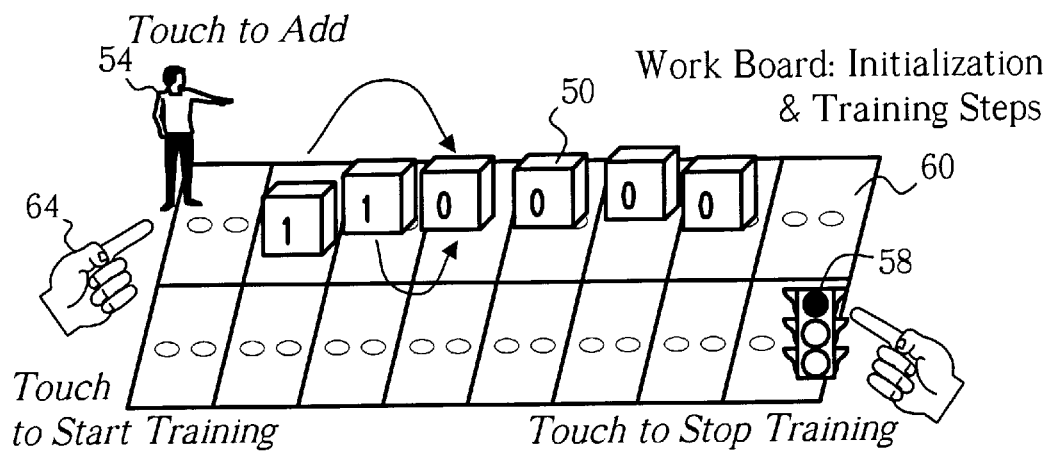
FIG. 4 shows the initiation and training steps for a program computing the Fibonacci sequence.
Figure 5:
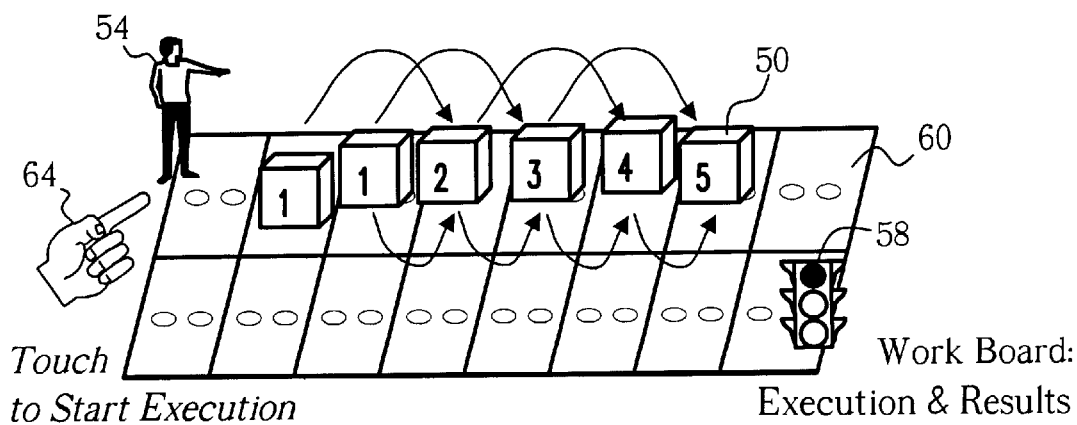
FIG. 5 shows the execution and results of the Fibonacci sequence program.
Figure 6A:
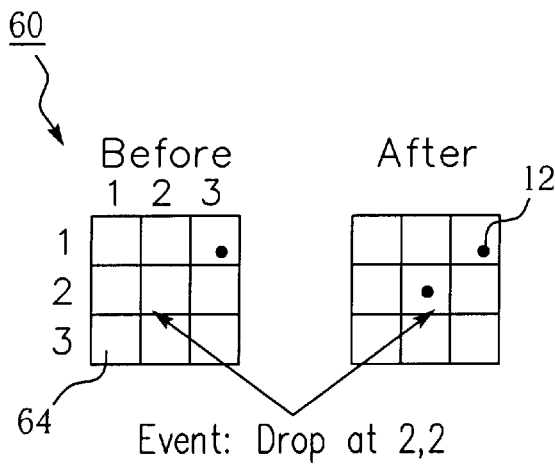
FIGS. 6(a)–6(d) shows various events in a visual tangible interface.
Figure 6B:
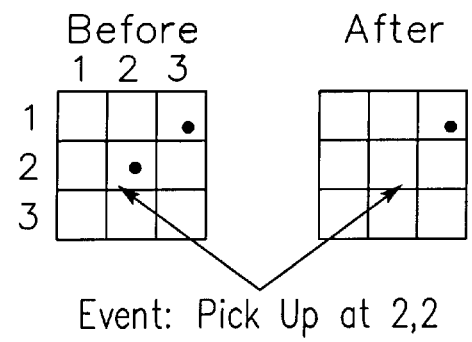
Figure 6C:
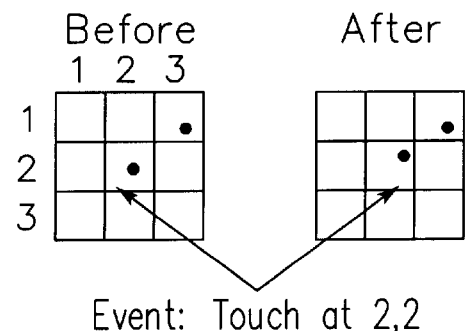
Figure 6D:
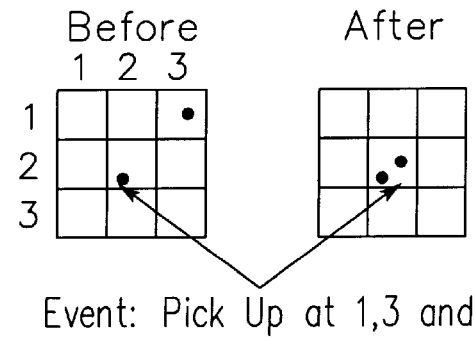

The Number blocks 50 are used to represent numeric expressions such as the combined data/operator phicon 124 values such as the data phicon 122, and numeric operations. For example, operations can include addition, subtraction, multiplication, and division. The checker phicon 52, which is shown as a scale, is used to represent a conditional expression. The robot phicon 54 is used to represent iterations and procedural abstractions. For example, when a robot phicon 54 is touched, the robot 54 remembers subsequent actions. This is called robot training of the phicons 12. If the robot phicon 54 is touched again, it will execute those subsequent actions again for all of the phicons 12 adjacent to the robot phicon 54. A count-down robot phicon 56 is used to represent iterations. Touching the count-down robot phicon 56 results in it remembering the subsequent actions. The stoplight phicon 58 is used to represent interface state control. For example, touching a stoplight phicon 58 can result in a signal ending robot training of a robot phicon 54 or a count-down robot phicon 56. FIGS. 4 and 5 show how a program is constructed, using the language elements shown in Table 2 and FIG. 3, to determine a Fibonacci sequence.

As shown in FIG. 4, data is initialized when a user picks up a series of blocks 50 representing various numbers and variables, and drops the blocks 50 onto a grid 60 in a line, thus forming a data sequence. In this example, the number represented by the blocks 50 are set by default to zero. Initial conditions of the program are set by entering the data value 1 into the first two blocks 50. The user then picks up a stoplight phicon 58 and places it on any grid element that is not horizontally adjacent to the row of numbers.

Next, as shown in FIG. 4, a robot phicon 54 is initialized and trained. Training the robot phicon 54 occurs when a user picks up the robot phicon 54 and drops it immediately to the left of the row of numbers. The user touches the robot phicon 54 to signal start of training the robot phicon 54.

Then, as shown in FIG. 4, training for one iteration occurs when the user picks up the first number block 50 in the row, which is immediately to the right of the robot 54, and touches the first number block 50 to the third number block 50, thereby performing an addition operation. That is, the value of the first number block 50 is added to the value of the third number block 50. The user then picks up the second number block 50 and touches the send number block 50 to the third number block 50, resulting in another addition operation. That is, the value of the second number block is added to the value of the third number block 50. The user then touches the stoplight 58 to signal end training to the robot phicon 54.

A program has thus been created which may be immediately executed or translated into another programming language. The row of blocks 50 immediately to the right of the robot phicon 54 have special significance, and are called the robot context. Actions taken with respect to the robot context are interpreted to mean a relative location with respect to the robot phicon 54. Iteration is achieved by adding an incremental offset to these values associated with these number blocks 50. The offset is incremented from zero to the number of objects 50 in the context. When an iteration occurs that derives a value outside of the context, execution of the robot phicon 54 stops.

Next, as shown in FIG. 5, re-initialization and execution of the sequence computation occurs when the user resets value of the third number block 50 to zero. Execution is accomplished by touching the robot phicon 54 again to cause the robot phicon 54 to execute the computation steps for every number in the row.

Tangible input events described above with respect to FIG. 4 for determining the Fibonacci sequence are shown in Table 3.

The robot training for Fibonacci sequence programming can be traced as follows using FIG. 4 and Table 3. The robot phicon 54 is located at cell location (0, 0) and training starts when the user 64 touches the robot phicon 54. Number blocks 50 in the robot context are located immediately to the right of the robot phicon 54 at cell locations (0, 1), (0, 2) and (0, 3). Each time an event occurs during robot training in a cell located in the robot context, a robot context number is calculated as the number of horizontal cells 62 to the right of the robots' location, minus one. When the first number block 50 at cell location (0, 1) is picked up, the robot context number is set to 0. For the event "pick up", the cell location (0, 1) and the context number 0 are remembered. When the first number block 50 is touched to a number block 50 at cell location (0, 3), the event "touch", location (0, 3) and robot context 2 are remembered. The value of the first number block 50 is added to the value of the number block 50 located in cell location (0, 3). When the first number block 50 is returned to its original cell location (0, 1), the event "drop", location (0, 1) and robot context number 0 are remembered. When the user 64 picks up the second number block 50 from cell location (0, 2), the event "pick up", location (0, 2) and robot context number 1 are remembered. When the second number block 50 is touched to a number block 50 at cell location (0, 3), the event "touch", location (0, 3) and robot context number 2 are remembered. The value of the second number block 50 is added to the value of the number block 50 located in cell location (0, 3). When the second number block 50 is returned to its original cell location (0, 2), the event "drop", location (0, 2) and robot context number 1 are remembered. Robot training stops when the user 64 touches the stop light 58 at cell location (1, 7).

Calculation of Fibonacci numbers are computed for an entire sequence of number blocks 50 by executing the remembered instructions for the robot phicon 54. FIG. 5 shows execution of the remembered sequence. The robot phicon 54 is located at cell location (0, 0) and execution starts when the user 64 touches the robot phicon 54 for a second time (the first time was for learning the sequence, above). Number blocks 50 in the robot context are located immediately to the right of the robot phicon 54 at cell locations (0, 1), (0, 2), and (0, 3). Each time an event occurs during robot execution in a cell loated in the robot context, the remembered robot context number is used to calculate a cell location where the robot action is to occur. The cell location is calculated as the remembered robot context number plus the horizontal cell location of the robot phicon 54 plus one. The first remembered action causes a pick up event for the number block 50 at cell location (0, 1). The next remembered action causes a touch event to occur on the number block 50 at cell location (0, 3). The value of the first number block 50 is added to the value of the number block 50 located in cell location (0, 3). The next remembered action causes a drop event of number block 50 at cell location (0, 1). The next remembered action causes a pick up event for the number block 50 at cell location (0, 2). The next remembered action causes a touch (event to occur on the number block 50 at cell location (0, 3). The value of the second number block 50 is added to the value of the number block 50 located in cell location (0, 3). The next remembered action causes a drop event of the second number block 50 at cell location (0, 2).

Increasing the robot context number by an offset of one slides the entire addition sequence of instructions one cell location to the right. Thus, if an offset of one is used, the original sequence of operations on cells located in (0, 0), (0, 2), (0, 0), (0, 1), (0, 2), (0, 1) become operations on the cells located in (0, 1), (0, 3), (0, 1), (0, 2), (0, 3) and (0, 2). When an offset context number calculates a cell location that exceeds the number of number objects 50, execution of the operations, or program, of the robot phicon 54 stops.

The Fibonacci tangible program shown in FIG. 4 thus demonstrates a procedural abstraction containing iteration and computation. It should be noted that a user 64 is physically touching or moving or otherwise contacting a physical object 12 having attributes which may be reassigned according to programming rules based on the physical location of the phicon 12, the physical appearance of the phicon 12, and any movement of the phicon 12. Phicons 12 are not limited to specific forms because each phicon 12 is described by the attributes assigned by the user or the system to that phicon 12.

As shown in FIGS. 6(*a*)–6(*d*), when a user touches, pushes, pickups, drops, or otherwise interacts with a particular tangible object 12, the interaction is observed by the event recognition subsystem 16. The event recognition subsystem 16 understands an applied action and its associated meaning to based on the particular object 12 and the associated attributes of the particular object 12. The system 10 reacts to what is observed and generates program language and/or an executed program language (e.g. visual graphical display). FIGS. 6(*a*)–6(*d*) depict successive images recognizing the events of drop, pickup, touch, and "touch objects together," respectively. The drop event shown in FIG. 6(*a*) is determined by the appearance of an object 12 in a previously empty location on the grid 60. The pickup event shown in FIG. 6(*b*) is determined by the disappearance of an object 12 from a previously occupied location on the grid 60. As shown in FIG. 6(*c*), movement of a second object 12 within a previously occupied location 64 indicates the touching of the first object 12 to the second object 12. An object 12 must exceed some threshold percentage of the location 64, for example 33%, in order to qualify as a touch event. As shown in FIGS. 6(*c*) and 6(*d*), touching two objects 12 together is indicated by placing two objects 12 within one location 64. Thus, as shown in FIG. 6(*d*) touching two objects 12 together may actually corresponds to two events: a pickup from location (1, 3) and a touch at location (2, 2).

Figure 7:
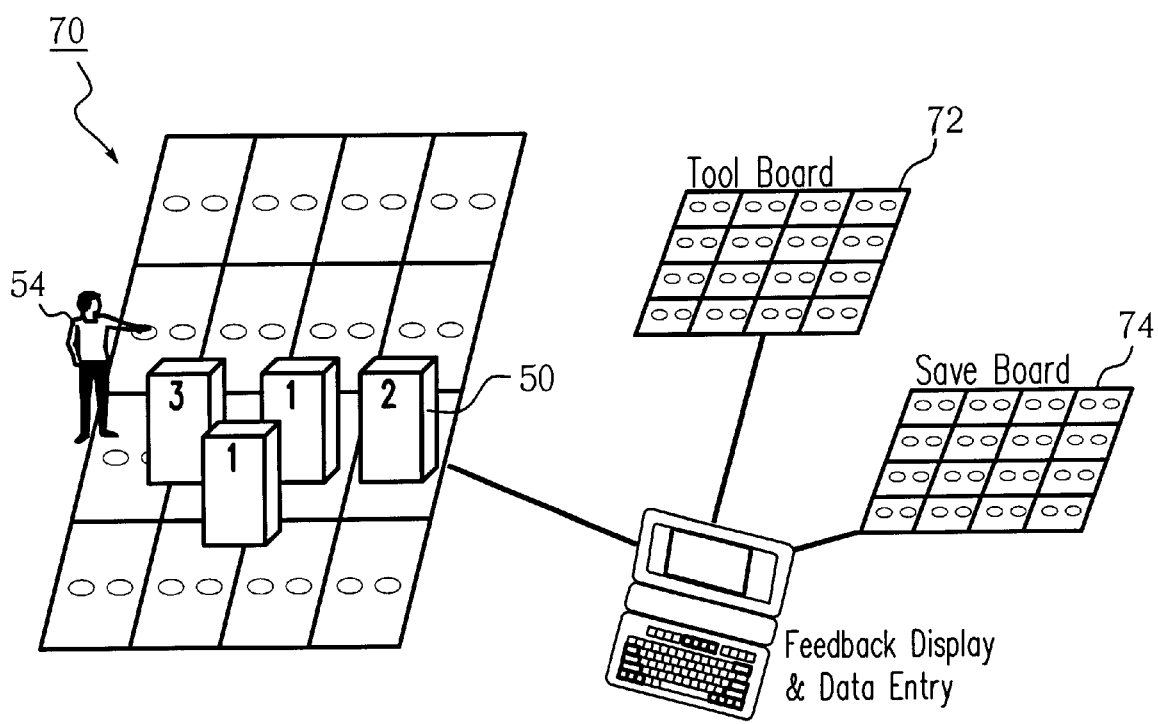
FIG. 7 shows invocation of a translation function in a visual tangible interface.

In another embodiment, tangible programs may be executed by an interpreter within the tangible computing environment or may be translated into a mainstream programming language like Java or C. In FIG. 7, a translation function is invoked when a robot phicon 54 is dropped on the save board 74 followed by subsequent execution. Any convention that permits the capturing of initial conditions for data definitions is also acceptable. For generating equivalent Java code, for example, each invocation of the translation produces a Java class with a main method for the executing robot phicon 54. The behavior of the robot phicon 54 is translated into a Java method for this generation class. A temporary variable is associated with each tangible location, and the these variables correspond to location values. Actions made with respect to these locations may use these temporary variables for intermediate computations. Data flow analysis can eliminate these variables in a subsequent code generation step. Additionally, there is a common class, JCG, shared by all generated code that defines the location variables and numeric operation methods. Each robot phicon 54 is represented by a method that has an identified context, and each identified context may be defined as either null, as a context array, or as array indexes into the temp array. Each main routine for a robot phicon 54 is called within a loop for any given non-null context, resulting in iterative program structure. Furthermore, each checker 52 invocation defines an if-then-else construct of the conditional expression.

By way of example, Tables 4–8 describe the state transitions for various physical manipulations. In particular, state transitions for drop, touch, pickup and data entry are described for this Tangible Programming Language.

In particular, each state Q is a function of the set of Tangible Programming Object O introduced into the work space, the locations L of the work space, a mapping $\zeta_O$ of the Objects O onto the locations L, a processing mode m and a selected one S of the Objects O. Specifically, O is the union of all number blocks 50, checkers 52, robots 54 and 56 and stop lights 58. It should be appreciated that each object O has a set of attributes in some domain. The attributes are preferably described by a functional notation, where, for example, "value (o)" means the "value" attribute of object O. Table 4 outlines the attributes.

It should also be appreciated that the locations L include an "unknown" location, "in hand" location and the work space locations. Furthermore, a work space location preferably is defined as the triplet <board, row, column>, where "board" includes a "Tool Area" board, a "Save Area" board and a "Work Area" board. The Tool Area board is used to assign object types and attribute values to an undefined phicon 12. The Save Area is used to invoke save routines. The Work Area is where the objects are placed to generate programming events and to form data structures or data sequences, as described above. The "unknown" location is used when an object's location becomes undefined. The "in-hand" location is used to indicate an object has been picked-up or otherwise removed from a previous location during a gesture with that object.

The processing mode m includes "train" "normal" and "execute". Input I is a function of both the Tangible Interface events, e, and the location of the event, l. Tangible Interface event, e, includes "drop", "pick up", "touch" and "data entry". The location of the event t is mode dependent. In "normal" and "train" modes, the Tangible Interface provides a global board location. In "execute" mode, the event location 1 may also be relative to the location of the executing robot.

Thus, the initial system state $q_O$ is a function of the set of Tangible Programming Objects O, the location L of the workspace, and $\zeta_O(o)$ is the initial mapping of the Object O onto the location L when all objects are off the boards except for the tool objects in the "Tool Area" and nothing is selected.

Thus, as described above, any state Q is:

$$Q = \{O, L, \zeta_O, m, S\},$$

where:

O = set of tangible Programming objects = {numbers}∪{checkers}∪{robots}∪{stop indicators}, {robots} = {walking robots}∪{countdown robots}; "{numbers}" represents the set {o|o∈O, kind(o)= Number};

L = {Unknown}∪{In Hand}∪N³;

$N^3 = B \times N \times N$ = set of triplets <board, row, column>;

B = {Tool Area, Work Area, Save Area};

$\zeta_O$: O→L;

m∈M = {Normal, Train, Execute};

S⊆O = the selected object;

$\sigma_L$ is the inverse mapping of $\zeta_O$, (i.e., $\zeta_O^{-1}$, mapping location to object);

I = {e, l}, e = Tangible Interface Event∈E = {Drop, Pickup, Touch, Data Entry};

t = location of event∈L-({Unknown}∪{In Hand});

T⊆O is the tool objects in the Tool Area. Note: This is a predefined configuration such that for $t_{ij} \in T$, $\zeta_O(t_{ij})$ = <Tool Area, i, j>;

β: L→B is the projection function of a location L onto the board (e.g., β(<b,i,j>)=b); and $q_O$ = Initial System state = {O, L, $\zeta_O(o)$ = <Tool Area, i,j> if o = $t_{ij} \in T$. Unknown otherwise, S = { }}.

A Tangible Programming Language is very context sensitive and involves a limited number of elements which are constrained by correspondence to physical manifestations (e.g., objects, gestures). Hence, the Tangible Programming Language is represented by a state transition function.

The state transition function, δ, of the Tangible Programming Language is given in Tables 5–8. The state transition function maps States (i.e., q∈Q) to States based on Input values (i.e., δ: Q×I→Q). Tables 5–8 describe this mapping for subsets of Q×I characterized by variability in what object is selected (S), the interface mode (m), the object being acted on by the input action (◊ ℓ), and distinguishing between robots with and without memory), the board in which the input action is occurring (ℬ(ℓ)), and the kind of input event (E). This characterization leads to 1080 possible state-input combinations (5*3*6*3*4) whose transitions are described by the 32 rules given in Tables 5–8. Furthermore, the error transition rules described in Tables 5–8 are not mutually exclusive.

Conditional logic in the Tangible Programming Language definition is expressed by applying data objects 50 to a checker object 52. This is done by placing the checker object 52 between two number blocks 50 and touching the checker 52. This is described in Rule T7. It should be appreciated that numbers and checker objects shall (or must be) all aligned on the same board, same row, in adjacent column locations. A checker 52 is capable of making one of the following comparisons: greater than (>), greater than or equal (≧), less than (<), less than of equal (≦). If a greater comparison (>,≧) is used, the numbers are compared and the larger number is place to the left of the checker 52 (i.e., location with the lower column value). The smaller number is placed to the right of the checker. Similarly, if the lesser comparison (<,≦) is used, the smaller number is placed to the left and the larger number is placed to the right of the checker.

Figure 8:
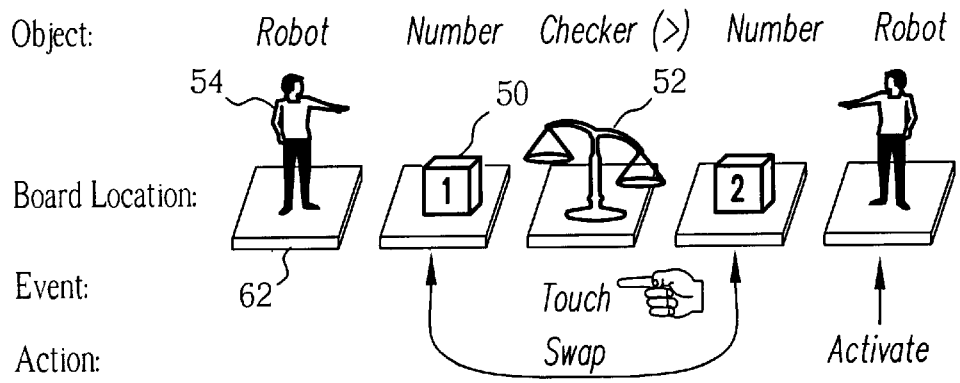
FIG. 8 shows conditional logic performed by a checker object.

FIG. 8 shows a more general comparison operation. If robots 54 and/or 56 are placed in line to each side of the number blocks 50 and checkers 52, then the appropriate robot 54 and/or 56 is invoked when the checker 52 is activated. That is, if a "greater than" or "greater than or equal to" comparison (<or ≦) is used, the number blocks 50 are compared and the robot 54 and/or 56 to the left of the checker 52 (i.e., location with the lower column value) is activated if the comparison holds true. Otherwise the robot 54 and/or 56 to the right is activated. If the lesser comparison is used, the sequence of robot activation is swapped. The number blocks 50 are compared and the robot 54 and/or 56 to the right of the checker 52 is activated if the comparison holds true. Otherwise the robot 54 and/or 56 to the left is activated.

There are two types of robot objects 54 or 56 in Tangible Programming Language: walking robots 54 and countdown robots 56. Walking robots 54 are associated with a line of objects 50 located in adjacent locations: same board, same row, contiguous column locations. Countdown robots 56 have a single number object as their context that they use for counting. Hence, for countdown robots 56 the context terminates no more than one location to the right of where the robot is dropped.

Whenever an action occurs during robot training, the following items are recorded:

1. The event, e∈E={Drop, Pickup, Touch, Data Entry},
2. whether the event was contextual or normal,
3. the location of event, ℓ∈L=({Unknown}∪{In Hand}), if the event was a normal event, and
4. the context number if the event was contextual, where the context number is defined by the column offset of the context object's location relative to the column location of the robot 54 or 56.

The robots 54 and 56 are executed by replaying, in order, the actions recorded during a training session. If the robot is a walking robot 54, then the entire set of trained actions are performed repetitively, where the number of iterations performed is based on the size of the robot's context. If the robot is a countdown robot 56, the entire set of trained actions is performed the number of times indicated by the number value in the robot's context.

Figure 9:
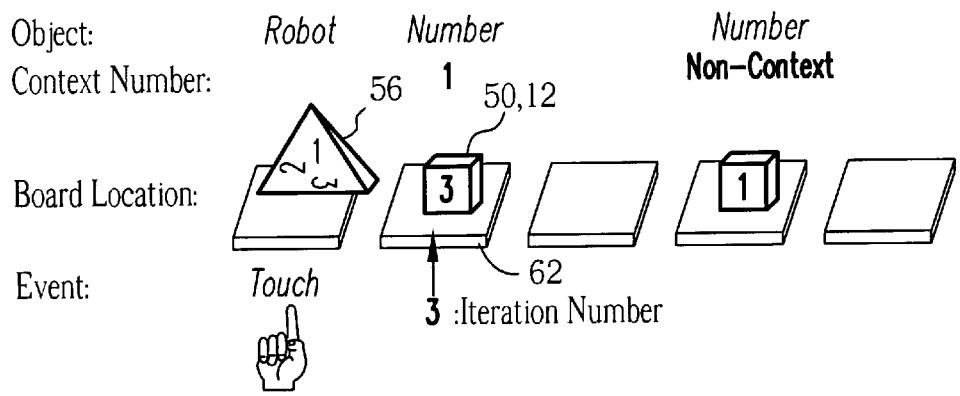
FIG. 9 shows an iteration performed by a countdown robot object.
Figure 10:
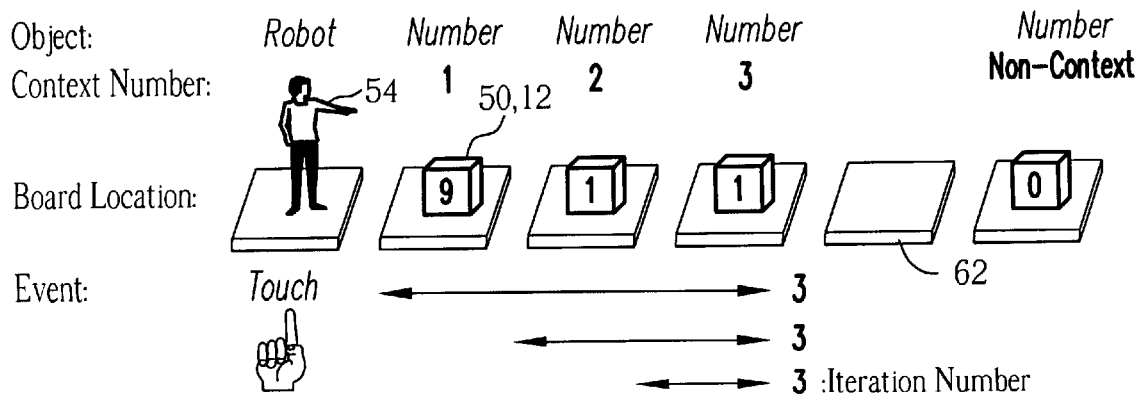
FIG. 10 shows an iteration performed by a walking robot object.

Tables 5–8 are again used to the determine the state transitions made by the robot actions, with the following exceptions:

1. If the event is a contextual event and the robot is a countdown robot 56, then the object 50 being acted on by the input action is determined by the object's context number. Namely, if the context number is c and the robot location is given by the coordinates <board, row, column>, then the object being acted on is the object located at <board, row, column+c>(i.e., O(<board, row, column+i>), provided this is a valid location. FIG. 9 shows the operation of countdown robot 56;
2. If the event is a contextual event and the robot is a walking robot 54, then the object 50 being acted on by the input action is determined by the object context number and an iteration number. The iteration number starts at zero and increments up to the size of the context. Namely, if the context number is c, the iteration number is i, and the robot location is given by the coordinates <board, row, column>, then the object being acted on is the object located at <board, row, column+c+i>(i.e., O(<board, row, column+c+i>), provided this is a valid location. FIG. 10 shows the operation of a walking robot 54;
3. The execution of the robots 54 and 56 is stopped if there is any error condition; and
4. The context locations for walking robots 54 are checked before every iteration to ensure they are valid locations. The execution of the walking robot 54 is stopped otherwise.

Additionally, Tangible Programming Language has the convention that if the robot 54 or 56 being executed has the same label as the robot in the Save Area, then the equivalent Java code is generated for this robot invocation. Code generation is described in detail below.

Tangible Programming Language has its own interpreter. Robot objects 54 and 56 embody the behavior of programs and may be saved in persistent storage. A Tangible Programming Language program may be translated into a program in another general purpose programming language, such as, for example, Java or C. This makes the Tangible Interface a general purpose programming environment with the unique capability that programs are created by arranging the physical objects 12.

The translation function of Tangible Programming Language to Java is given in Table 9. Each invocation of the translation produces a Java class with a main method function. State Transition Rule T6 in Table 8 outlines the invocation steps. The behavior of each robot object 54 or 56 is translated into a Java method for this generation class.

For this version of the code generation, a temporary variable is associated with each tangible location. These variables are called "Temp[board][row][column]" and "In_Hand" for the corresponding location values. In Table 9, the notation "Temp(ℓ)" is used to represent"Temp[board][row][column]", where ℓ=<board, row, column>. Actions made with respect to these locations may use these temporary variables for intermediate computations. Data flow analysis will be able to eliminate these variables in a subsequent code generation step. Each robot 54 or 56 is represented by a method which has a context array "Context" as a parameter. In Table 9, the notation "Context[c]" is used to represent the context array location for the context number "c" for the specified event.

Conditional logic in Tangible Programming Language is expressed by applying data objects 50 to a checker object 52. This is done by placing the checker object 52 between two data blocks 50 or sets of data blocks 50 and touching the checker 52, and is described in Rules T7 and GK. Generation of code for the checker 52 requires looking at the numbers associated with the checker 52 and, optionally, the robot objects 54 and/or 56 associated with each branch of the check 52.

In this manner, we can define

"RHS(ℓ, n)" as the location of object RHS n places to the right of the checker 52, "LHS(ℓ, n)" as the location of object LHS n places to the left of the checker 52, and "oper" as the conditional operator associated with this checker 52 (for example ">" or ?"<").

If RHS is a non-robot object and is located 2 places to the right of the checker 52, RHS(ℓ, 2), or LHS is a non-robot object and is located 2 places to the left of the checker 52, LHS(ℓ, 2), then the generated code for this conditional logic is:

```
if (! (Temp(LHS(l , 1)oper Temp(RHS(l , 1))) {
    int temp = Temp(LHS(l , 1));
    Temp(LHS(l , 1)) = Temp(RHS(l , 1));
    Temp(RHS(l , 1)) = temp;
}
```

If RHS is a robot object 54 and/or 46, and is located 2 places to the right of the checker 52, RHS(ℓ, 2), and LHS is a robot object 54 and/or 56, and is located 2 places to the left of the checker 52, LHS(ℓ, 2), then:

"RHSMethod( )" denotes the method generated from the right robot 54 or 56, and "LHSMethod( )" denotes the method generated from the left robot 54 or 56.
The generated code for this conditional logic is given by:

```
if (! (Temp(LHS(l , 1)oper Temp(RHS(l , 1))) {
    int temp = Temp(LHS(l , 1));
    Temp(LHS(l , 1)) = Temp(RHS(l , 1));
    Temp(RHS(l , 1)) = temp;
    RHSMethod( );
} else {
    LHSMethod( );
}
```

Each robot method is named by its label attribute where "name" is the label attribute of the robot "label( )".

Whenever a robot method is invoked, the robot context must be passed as a parameter. Namely, the Temp locations adjacent to the current location of the robot are converted into a context array of the correct dimensions. This code is indicated by the notation, "GetContext( )", below.

If a walking robot 54 has no context, then the following code is generated:
    name.Method(null);
The following code is generated for all other walking robots 54:

```
Context = GetContext( );
for (int i=0; i<Context.length; i++) {
    name.Method(Context);
}
```

The following code is generated for all countdown robots 54:

```
Context = GetContext( );
for (int i=Context[0]; i>0; i--) {
    name.Method(Context);
};
```

As shown in FIGS. 1–9, Tangible Programming is preferably implemented on a programmed general purpose computer system. However, the Tangible Programming can also be implemented on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA, FPGA or PAL, or the like.

As will be understood by those familiar in the art, the present invention may be embodied in other specific forms without departing from the spirit or essential characteristics thereof. For example, any real object may be used to represent a program function or group, and the real object itself may contain or be assigned numerous objects. Observation of the real objects by computer may be visual, or alternatively by electronic sensing. Electronic sensing could include pressure differentiation, object size, object shape capacitance or inductive sensing. The object could be "charged" to represent attributes, for example, a number block can be charged to "X" units. Additionally, the object could emit a signal identifying itself to a receiver. Although certain preferred embodiments have been shown and described, it should be understood that many changes and modifications may be made therein without departing from the scope of the appended claims.

Thus, while this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

TABLE 1

| Kind | Description | Event Examples |
| --- | --- | --- |
| Translation | Object moves in space | drag, drop, hold, move, pick up, pull, push, roll, shake, slide, throw |
| Orientation | Object changes orientation in space | flip, spin, turn |
| Gesture | Make a physical or vocal gesture at an object | cover, hit, point at, strike, talk to, tap, turn, uncover, wave, yell at |
| Deformation | Object changes shape | flatten, cut, squash, stretch, twist |
| Appearance | Object changes appearance | color, erase, illuminate, mark up, smooth |
| Composition | Change the composition of an object | fill, mix, pour, pump up |
| Relational | Several objects change relative orientation | attach, break, combine, connect, cover, tap, touch, glue, point with, seperate, tighten |

TABLE 2

| Phicon | What it Represents | Operations |
| --- | --- | --- |
| Number Block | Numeric expression | Pick Up to remove from a computational scope, Drop to add to a computational scope. Touch a Number Block to output its value. Touch a Number Block to another Number Block to perform a numeric computation. |
| Scale/Balance FIG. 52 (a "Checker") | Conditional expression | Pick Up to remove from a computational scope, Drop to add to a computational scope. Touch a Checker to invoke the testing of the condition (i.e., compare the phicons or sets of phicons adjacent to the Checker and take appropriate action). |
| Robot FIG. 54 | Iteration and procedural abstraction | Pick Up to remove from a computational scope, Drop to add to a computational scope. Touch a Robot once to have it remember subsequent actions (robot training). Touch a Robot again to execute those actions again for all objects adjacent to the Robot. |

TABLE 2-continued

| Phicon | What it Represents | Operations |
|---|---|---|
| Countdown Robot FIG. 56 | Iteration | Pick Up to remove from a computational scope, Drop to add to a computational scope.<br>Touch a Robot once to have it remember subsequent actions. Touch a Robot again to execute those actions again for the number of times indicated by an adjacent Number block of set of objects. |
| Stop Light 58 | Interface state control | Pick Up to remove from interface, Drop to add to interface.<br>Touch a Stop Light to signal the end of robot training. |

TABLE 3

| Event Kind | Board | Cell Location | Context Number |
|---|---|---|---|
| Pick up | Work Board | (0,1) | 0 |
| Touch | Work Board | (0,3) | 2 |
| Drop | Work Board | (0,1) | 0 |
| Pick up | Work Board | (0,2) | 1 |
| Touch | Work Board | (0,3) | 2 |
| Drop | Work Board | (0,2) | 1 |

Note that the Robot being trained is on the Work Board at cell location (0,0).

TABLE 4

| Tangible Object Type | Attribute | Description |
|---|---|---|
| All objects | label( ) | A string of characters attached to each object representing a user defined name of the object. The default value is the object type. |
| Numbers | value( ) | A string of characters representing a user defined value of the data object. The default value is 0. |
| Numbers | oper( ) | A numeric operation to be performed on data, including addition (+), subtraction (−), multiplication (*), and division (/). The default value is +. |
| Checkers | oper( ) | A logical operation to be performed on data, including greater than (>), greater than or equal ($\geq$), less than (<), less than or equal ($\leq$). The default value is $\geq$. |
| Robots | memory( ) | A list of Tangible Programming Input actions that is associated with a robot. Robot training consists of recording the actions a user makes and assigning them to the robot's memory attribute. Robot execution consists of replaying these actions in a new execution context. The default value is { }. |

TABLE 5

State Transition Function, $\delta$, Transitions for Drop Inputs.

| Rule | STATE $\{O, L, L_o, m, S\}$ | INPUT $\{e, l\}$ | TRANSITION STATE $\{O, L, L_o, m, S\}$ | EFFECT | COMMENT | EXPLANATION |
|---|---|---|---|---|---|---|
| D1 | $S = \{5\}$, s$\in$O<br>m $\in$ M | e = Drop, where<br>$\beta(l)$=Work Area<br>$O_L(l) = \{\}$ | $L_o(s) = l$<br>$S = \{\}$ | | Drop an object | State/Input: In all modes of operation, when an object is selected, a drop event occurs in a Work Area location where there is an no object already present. Transition: The object location is set to the drop location and no object is in hand and selected. Side Effect: None. |
| D2 | $S = \{s\}$, s $\in$ {robots}<br>m $\in$ M | e = Drop, where<br>$\beta(l)$=Save Area<br>$O_L(l) = \{\}$ | $L_o(s) = l$<br>$S = \{\}$ | Store robot | Save robot in persistent store using label(s) as a storage name | State/Input: In all modes of operation, when a robot object is selected drop event occurs in a Save Area location where there is an no object already present. Transition: The object location is set to the drop location and no object is in hand and selected. Side Effect: The robot memory is saved in external storage. |
| D3 | $S = \{s\}$,<br>s $\notin$ {robots}<br>m $\in$ M | e = Drop, where<br>$\beta(l)$=Save Area<br>$O_L(l) = \{\}$ | $L_o(s) = l$<br>$S = \{\}$ | | Drop an object | State/Input: in all modes of operation, when an object other than a robot is selected, a drop event occurs in a Save Area location where there is an no object already present. |

TABLE 5-continued

State Transition Function, δ, Transitions for Drop Inputs.

| Rule | STATE $\{O, L, L_o, m, S\}$ | INPUT $\{e, l\}$ | TRANSITION STATE $\{O, L, L_o, m, S\}$ | EFFECT | COMMENT | EXPLANATION |
|---|---|---|---|---|---|---|
| D4 | m ∈ M | e = Drop, where β(l) = Tool Area | m = Normal (Cancels any robot activity and resets) | Error processing | Can only touch in the tool area | Transition: The object location is set to the drop location and no object is in hand and selected. Side Effect: None. State/Input: In all modes of operation, a drop event occurs in a Tool Area location. Transition: The system mode returns to Normal. Side Effect: Error processing is initiated. |
| D5 | S = {s}, S∈O m ∈ M | e = Drop, where $O_L$ (l) ≠ {} | m = Normal | Error processing | Cannot drop an object on an object | State/Input: In all modes of operation, a drop event occurs in location where there is already an object present. Transition: The system mode returns to Normal. |
| D6 | S = {} m ∈ M | e = Drop | m = Normal | Error processing | Cannot drop something if it is not being held | Side Effect: Error processing is initiated. State/Input: In all modes of operation, a drop event occurs there is no object in hand. Transition: The system mode returns to Normal. Side Effect: Error processing is initiated. |

TABLE 6

State Transition Function, δ, Transitions for Pick Up Inputs

| Rule | STATE $\{O, L, L_o, m, S\}$ | INPUT $\{e, l\}$ | TRANSITION STATE $\{O, L, L_o, m, S\}$ | EFFECT | COMMENT | EXPLANATION |
|---|---|---|---|---|---|---|
| P1 | S = {} m ∈ M | e = Pickup β(l)≠Tool Area $O_L$ (l) ≠ {} | $L_o(O_L(l))$= In Hand S = {$O_L$ (l)} | | Pick Up an object | State/Input: In all modes of operation, when no object is selected, a pick up event occurs in a location not in the tool area where there is an object. Transition: The object location is set to In Hand and the object is designated as the selected object. Side Effect: None. |
| P2 | S = {s}, S∈O m ∈ M | e = Pickup β(l) ≠ Tool Area $O_L$ (l) ≠ {} | $L_o$(l))=In Hand $L_o$(s)=Unknown S = {$O_L$ (l)} | | Pick Up an object and remove the previously held object from any board or selection | State/Input: In all modes of operation, when an object is selected, a pick up event occurs in a location not in the tool area where there is an object. Transition: The object location is set to In Hand and the object is designated as the selected object. The object previously in hand before the pick up is ignored. Side Effect: None. |
| P3 | m ∈ M | e = Pickup, where β(l)=Tool Area | m = Normal | Error processing | Can only touch in the tool area | State/Input: In all modes of operation, a pick up event occurs in a Tool Area location. Transition: The system mode returns to Normal. Side Effect: Error processing is initiated. |
| P4 | m ∈ M | e = Pickup $O_L$ (l) = {} | m = Normal | Error Processing | Cannot Pick Up something from a place where there is nothing. Cancels any robot activity and resets. | State/Input: In all modes of operation, when no object is in hand, a pick up event occurs in a location where there is no object. Transition: The system mode returns to Normal. Side Effect: Error processing is initiated. |

TABLE 7

State Transition Function, δ, Transitions for Data Entry Inputs

| Rule | STATE {O,L, $L_o$, m, S} | INPUT {e, l} | TRANSITION STATE {O,L, $L_o$, m, S} | EFFECT | COMMENT | EXPLANATION |
|---|---|---|---|---|---|---|
| E1 | S = {s}, SE ∈ {numbers} m ∈ M | e = Data Entry | | Set value(s) to Data Entry value | Set a data value | State/Input: In all modes of operation, when a number object is selected, a data entry event occurs. Transition: None. Side Effect: Set the value attribute of the object to the data entry value. |
| E2 | S = {s}, s ∉ {numbers} m ∈ M | e = Data Entry | | Set label(s) to Data Entry value | Set a label value | State/Input: In all modes of operation, when some object other than a number is selected, a data entry event occurs. Transition: None. Side Effect: Set the label attribute of the object to the data entry value. |
| E3 | S = {} m ∈ M | e = Data Entry $O_L(<Save Area,0,0>) = \{\}$ ∃ o' ∈ {robots} where previously $L_o(o')$ = Unknown and label(o') = Data Entry | $L_o(o')$ = <Save Area, 0,0> | Fetch a robot | Access a robot by using the data entry value for the storage name | State/Input: In all modes of operation, when no object is selected and the Save Area (location 0,0) is empty, a data entry event occurs in the Save Area (location 0,0) and there is an unused robot (not already on any board) whose label attribute matches the data entry value. Transition: The location of the matching robot is set to the Save Area. Side Effect: The robot attributes are fetched from external storage. |
| E4 | S = {} m ∈ M | e = Data Entry $O_L(<Save Area, 0,0>) = \{\}$ there is no o' ∈ e {robots} where previously $L_o(o')$ = Unknown and label(o') = Data Entry | $L_o(o')$ = <Save Area, 0,0> for some o' ∈ {robots} where previously $L_o(o')$ = Unknown and memory(o')={} label(o') = Data Entry | Fetch an untrained robot | Access a new robot, using the data entry value for the storage name | State/Input: In all modes of operation, when no object is selected and the Save Area (location 0,0) is empty, a data entry event occurs in the Save Area (location 0,0) and there is no unused robot whose label attribute matches the data entry value. Transition: The location of any unused robot is set to the Save Area. Side Effect: The robot memory attribute i cleared and its label is set to the data entry |

TABLE 7-continued

State Transition Function, δ, Transitions for Data Entry Inputs

| Rule | STATE {O,L, $L_o$, m, S} | INPUT {e, l} | TRANSITION STATE {O,L, $L_o$, m, S} | EFFECT | COMMENT | EXPLANATION |
|---|---|---|---|---|---|---|
| E5 | S = {} m ∈ M | e = Data Entry $O_L$(<Save Area, 0,0>) ≠ {} where previously $L_o$(o′) = Unknown and label(o′) = Data Entry | $L_o$(<Save Area, 0,0>)= Unknown $L_o$(o′) = <Save Area, 0,0> | Fetch a robot | Remove the previous object from the Save Area and access a robot by using the data entry value for the storage name value. | State/Input: In all modes of operation, when no object is selected and the Save Area (location 0,0) is occupied, a data entry event occurs in the Save Area (location 0,0) and there is an unused robot whose label attribute matches the data entry value. Transition: The location of the matching robot is set to the Save Area. Side Effect: The robot attributes are fetch from external storage. |
| E6 | S = {} m ∈ M | e = Data Entry $O_L$(<Save Area, 0,0>)≠ {} there is no o′ ∈ {robots} where previously $L_o$(o′) = Unknown and label(o′) = Data Entry | $L_o$(<Save Area, 0,0>)= Unknown $L_o$(o′) = <Save Area, 0,0> for some o′ ∈ {robots} where previously $L_o$(o′) = Unknown and memory(o′)={} | Fetch an untrained robot label(o′) is set to Data Entry | Remove the previous object from the Save Area and access a new robot, using the data entry value for the storage name | State/Input: In all modes of operation, when no object is selected and the Save Area (location 0,0) is occupied, a data entry event occurs in the Save Area (location 0,0) and there is no unused robot whose label attribute matches the data entry value. Transition: The location of an unused, untrained robot is set to the Save Area. Side Effect: The robot label attribute is set to the data entry value. |

TABLE 8

State Transition Function, δ, Transitions for Touch Inputs.

| Rule | STATE {O,L, $L_o$, m, S} | INPUT {e, l} | TRANSITION STATE {O,L, $L_o$, m, S} | EFFECT | COMMENT | EXPLANATION |
|---|---|---|---|---|---|---|
| T1 | S = {} <br> m ∈ M | e = Touch <br> β(l) = Tool Area <br> $O_L$(l) ≠ {} | $L_o$(o') = In Hand for some o' ∈ O where initially $L_o$(l) = Unknown. <br> S = {o'} | Attributes of o' are set to attributes of $O_L$(l). | Get a new object from the Tool Area. Note that the Tool Area has the special property that it "generates" new objects upon touch. | State/Input: In all modes of operation, when no object is selected, a touch event occurs in the Tool Area where there is an object. <br> Transition: An unused object is selected and its location is set to in hand. <br> Side Effect: All attributes of the previously unused object are set to the values of the touched Tool Area object. |
| T2 | S={s}, s ∈ O <br> m ∈ M | e = Touch <br> β(l)=Tool Area <br> $O_L$(l) ≠ {} | $L_o$(o') = In Hand for some o' ∈ O where initially $L_o$(l) = Unknown. <br> S = {o'} <br> $L_o$(s) = Unknown. | Attributes of o' are set to attributes of $O_L$(l). | Get a new object from the Tool Area and remove the currently held object from any board or selection | State/Input: In all modes of operation, when an object is selected, a touch event occurs in the Tool Area where there is an object. <br> Transition: An unused object is selected and its location is set to in hand. The previously selected object is ignored. <br> Side Effect: All attributes of the previously unused object are set to the values of the touched Tool Area object. |
| T3 | S = {} <br> m ∈ M | e = Touch <br> $O_L$(l) ∈ {numbers} <br> β(l) = Work Area | | Output value | Print a value by touching it | State/Input In all modes of operation when no object is selected, a touch event occurs on a number located in the Work Area. <br> Transition: None. <br> Side Effect: The value attribute of the number is printed. |
| T4 | S = {} <br> m = Train | e = Touch <br> $O_L$(l) ∈ {stop indicators} <br> β(l) = Work Area | m = Normal | | Stop training a robot | State/Input: In the training mode of operation, when no object is selected, a touch event occurs on a stop indicator located in the Work Area. <br> Transition: The mode returns to normal. <br> Side Effect: None. |
| T5 | S={} <br> m ≠ Train | e = Touch <br> $O_L$(l)∈{robots} <br> memory($O_L$(l))={} <br> β(l)=Work Area | m = Train | Start training this robot | Robot training. | State/Input: In any mode of operation except training when no object is selected, a touch event occurs on an untrained robot (i.e., with an empty memory attribute) located in the Work Area. <br> Transition: The mode switches to training. <br> Side Effect: None. |
| T6 | S={} <br> m ∈ M | e = Touch <br> $O_L$(l) ∈{robots} <br> memory($O_L$(l))≠{} <br> β(l)=Work Area | m = Execute | Start this robot Generate code if generation selected | Robot execution and code generation. | State/Input: In any mode of operation, when no object is selected, a touch event occurs on a trained robot (i.e., with an non-empty memory attribute) located in the Work Area |

TABLE 8-continued

State Transition Function, δ, Transitions for Touch Inputs.

| Rule | STATE {O,L, L_o, m, S} | INPUT {e, l} | TRANSITION STATE {O,L, L_o, m, S} | EFFECT | COMMENT | EXPLANATION |
|---|---|---|---|---|---|---|
| | | | | | | Transition: The mode switches to execute. Side Effect: The robot's memory is used for the input stream of events. If the robot being executed has the same label as the robot in the Save Area, then the equivalent Java code is generated for this robot invocation. |
| T7 | S={}, m ∈ M | e = Touch O_L(l) ∈ {checkers} β(l)=Work Area | | Perform conditional logic | Do a comparison test between number objects. | State/Input: In any mode of operation, when no object is selected, a touch event occurs on an checker object located in the Work Area. Transition: Conditional logic is performed. Side Effect: Conditional logic is performed. |
| T8 | S={s}, S ∈ {numbers} m ∈ M | e = Touch O_L(l) ∈ {numbers} β(l)=Work Area | | Set value(O_L(l)) to value(O_L(l)) oper(s) value(s) | Perform an arithmetic operation on numbers that are touched together, where allowed operations are +, −, *, / and the default is +. | State/Input: In any mode of operation, when a number object is selected, a touch event occurs on a number object located in the Work Area. Transition: None. Side Effect: The value attribute of the touched number is updated. |
| T9 | S={s}, S ∈ {numbers} m ∈ M | e = Touch O_L(l) = {o} o ∉ {numbers} β(l)=Work Area | | | No Operation No meaning for touching numbers to non-numbers currently | State/Input: In any mode of operation, when a number object is selected, a touch event occurs on a another object that is not a number located in the Work Area. Transition: None. Side Effect: None. |
| TA | S={s}, S ∈ {stop indicators} m ∈ M | e = Touch O_L(l) ∈ {robots} β(l)=Work Area | | memory(O_L(l))={} | Erase a robot's memory by touching it with a stop indicator | State/Input: In any mode of operation, when a stop indicator object is selected, a touch event occurs on a robot object located in the Work Area. Transition: None. Side Effect: The robot memory attribute is cleared. |
| TB | S={s}, S ∈ {stop indicators} m ∈ M | e = Touch O_L(l) ={o}, o ∉ {robots} β(l)=Work Area | | | No Operation No meaning for touching the stop indicator to anything but a robot | State/Input: In any mode of operation, when a stop indicator object is selected, a touch event occurs on an object that is not a robot located in the Work Area. Transition: None. Side Effect: None. |
| TC | S={s}, s ∈ O − ({numbers}∪ {stop indicators}) m ∈ M | e = Touch O_L(l) = {o}, o∈O β(l)=Work Area | | | No Operation No meaning for touching things together other than numbers and the stop indicator currently | State/Input: In any mode of operation, when an object other than a number or stop indicator is selected, a touch event occurs on an object located in the Work Area. Transition: None. |

TABLE 8-continued

State Transition Function, δ, Transitions for Touch Inputs.

| Rule | STATE {O,L, L$_o$, m, S} | INPUT {e, l} | TRANSITION STATE {O,L, L$_o$, m, S} | EFFECT | COMMENT | EXPLANATION |
|---|---|---|---|---|---|---|
| TD | m ∈ M | e = Touch<br>O$_L$(l) = {} | m = Normal | Error processing | Can not touch nothing (no object where touch occurred) | Side Effect: None.<br>State/Input: In all modes of operation, a touch event occurs in a location where there is no object.<br>Transition: The system mode returns to Normal. |
| TE | m ∈ M | e = Touch<br>β(l)=Save Area | m = Normal | Error processing | Can not touch objects in save area | Side Effect: Error processing is initiated.<br>State/Input: In all modes of operation, a touch event occurs in a Save Area location.<br>Transition: The system mode returns to Normal. |
| TF | S = {}<br>m ≠ Train | e = Touch<br>O$_L$(l) ∈ {stop indicators}<br>β(l)=Work Area | | | No Operation<br>Stop indicator not used for stopping anything but training | Side Effect: Error processing is initiated.<br>State/Input: In any mode of operation other than training, when no object is selected, a touch event occurs on a stop indicator object located in the Work Area.<br>Transition: None. |
| TG | S = {}<br>m = Train | e = Touch<br>O$_L$(l) ∈ {robots}<br>memory(O$_L$ (l))={}<br>β(l)=Work Area | | | No Operation<br>There currently is no meaning for a robot training a robot | Side Effect: None.<br>State/Input: In the training mode of operation, when no object is selected, a touch event occurs on an untrained robot object located in the Work Area.<br>Transition: None.<br>Side Effect: None. |

TABLE 9

Generation of Java code from Tangible Programming Language

| Translation Rule | TPL Rule | STATE $\{O, L, L_o, m, S\}$ | INPUT $\{e, l\}$ | Is l Contextual | GENERATION | COMMENT |
|---|---|---|---|---|---|---|
| G1 | D1 | $S = \{s\}$, s∈O<br>m ∈ M | e = Drop, where<br>$\beta(l)$=Work Area<br>$O_L(l) = \{\}$ | N | If s∈{numbers}.<br>Temp(l) = In_Hand; | Drop an object. |
| G2 | D1 | $S = \{s\}$, S∈O<br>m ∈ M | e = Drop, where<br>$\beta(l)$=Work Area<br>$O_L(l) = \{\}$ | Y | If s∈{numbers},<br>Context [c] = In_Hand; | Drop an object. |
| G3 | D2 | $S = \{s\}$,<br>s ∈ {robots}<br>m ∈ M | e = Drop, where<br>$\beta(l)$=Save Area<br>$O_L(l) = \{\}$ | N | No Generation | Save robot. No code is generated for robot motion. |
| G4 | D2 | $S = \{s\}$,<br>s ∈ {robots}<br>m ∈ M | e = Drop, where<br>$\beta(l)$=Save Area<br>$O_L(l) = \{\}$ | Y | No Generation | Save robot. No code is generated for robot motion. |
| G5 | D3 | $S = \{s\}$,<br>s ∈ {robots}<br>m ∈ M | e = Drop, where<br>$\beta(l)$=Save Area<br>$O_L(l) = \{\}$ | N | If s∈{numbers}<br>Temp(l) = In_Hand; | Drop an object. |
| G6 | D3 | $S = \{s\}$,<br>s ≠ {robots}<br>m ∈ M | e = Drop, where<br>$\beta(l)$=Save Area<br>$O_L(l) = \{\}$ | Y | If s∈{numbers}<br>Context [c] = In_Hand; | Drop an object. |
| G7 | P1 | $S = \{\}$<br>m ∈ M | e = Pickup<br>$\beta(l)$≠Tool Area<br>$O_L(l) \neq \{\}$ | N | If $O_L(l)$∈{numbers}<br>In_Hand = Temp(l) ; | Pick Up an object |
| G8 | P1 | $S = \{\}$<br>m ∈ M | e = Pickup<br>$\beta(l)$≠Tool Area<br>$O_L(l) \neq \{\}$ | Y | If $O_L(l)$∈{numbers}<br>In_Hand = Context[c] ; | Pick Up an object. |
| G9 | P2 | $S = \{\}$<br>m ∈ M | e = Pickup<br>$\beta(l)$≠Tool Area<br>$O_L(l) \neq \{\}$ | N | If $O_L(l)$∈{numbers}<br>In_Hand = Temp(l) ; | Pick Up an object and ignore the currently held object. |
| GA | P2 | $S = \{s\}$, s∈O<br>m ∈ M | e = Pickup<br>$\beta(l)$≠Tool Area<br>$O_L(l) \neq \{\}$ | Y | If $O_L(l)$∈{numbers}<br>In_Hand = Context [c] ; | Pick Up an object and ignore the currently held object. |
| GB | E1 | $S = \{s\}$,<br>s∈ {numbers}<br>m ∈ M | e = Data Entry | N/A | In_Hand = Data_Entry_Value; | Set a data value. |
| GC | E2 | $S = \{s\}$<br>s∉ {numbers}<br>m ∈ M | e = Data Entry | N/A | No Generation | Set a label value |
| GD | E3 | $S = \{\}$<br>m ∈ M | e = Data Entry | N/A | No Generation | Fetch a robot. |
| GE | T1 | $S = \{\}$<br>m ∈ M | e = Touch<br>$\beta(l)$=Tool Area<br>$O_L(l) \neq \{\}$ | N/A | If $O_L(l)$ ∈{numbers},<br>In_Hand = Temp(l) ; | Get a new object from the Tool Area. Only Generate code for number objects. |
| GF | T2 | $S = \{s\}$, s∈O<br>m ∈ M | e = Touch<br>$\beta(l)$=Tool Area<br>$O_L(l) \neq \{\}$ | N/A | If $O_L(l)$ ∈{numbers},<br>In_Hand = Temp(l) ; | Get a new object from the Tool Area. Only Generate code for number objects. |
| GG | T3 | $S = \{\}$<br>m ∈ M | e = Touch<br>$O_L(l)$ ∈ {numbers}<br>$\beta(l)$=Work Area | N | println ( Temp(l) ; | Output value. |
| GH | T3 | $S = \{\}$<br>m ∈ M<br>$\beta(l)$=Work Area | e = Touch<br>$O_L(l)$ ∈ {numbers} | N/A | println (Context [c]) ; | Output value. |
| GI | T4 | $S = \{\}$<br>m ≠ Train | e = Touch<br>$O_L(l)$ ∈ {stop indicators}<br>$\beta(l)$=Work Area | N/A | No Generation | Stop training a robot. |
| GJ | T5 | $S = \{\}$<br>m ≠ Train | e = Touch<br>$O_L(l)$ ∈ {robots}<br>memory($O_L(l)$)={}<br>$\beta(l)$=Work Area | N/A | No Generation | Start training a robot. |
| GK | T6 | $S = \{\}$<br>m ∈ M | e = Touch<br>$O_L(l)$ ∈ {robots}<br>memory($O_L(l)$)={}<br>$\beta(l)$=Work Area | N/A | See Robot Execution details | Start executing this robot. |
| GL | T7 | $S = \{\}$<br>m ∈ M | e = Touch<br>$O_L(l)$ ∈ {checkers}<br>$\beta(l)$=Work Area | N/A | See Conditional Logic details | Compare number objects and make an appropriate action. |
| GM | T8 | $S=\{s\}$,<br>s∈<br>numbers<br>m ∈ M | e = Touch<br>$O_L(l)$ ∈ {numbers}<br>$\beta(l)$=Work Area | N | If op denotes oper(s),<br>Temp(l) = Temp(l) op In_Hand; | Perform an arithmetic operation on numbers. |
| GN | T8 | $S=\{s\}$,<br>s ∈ {numbers}<br>m ∈ M | e = Touch<br>$O_L(l)$ ∈ {numbers}<br>$\beta(l)$=Work Area | Y | If op denotes oper(s),<br>Context [c] = Context [c]<br>op In_Hand | Perform an arithmetic operation on numbers. |

What is claimed is:

1. An apparatus for generating computer programs, comprising:
   a physical space in which physical objects can be manipulated by a user;
   a plurality of physical objects locatable within the physical space, each object representing at least one of an information element, an interation and an action command;
   at least one sensor that observes physical manipulations on the physical objects occurring in the physical space and that generates corresponding electric signals based on the physical manipulations and the information elements, the iterations or the action commands represented by the manipulated physical objects; and
   a processor that receives as inputs the electric signals, generates portions of information content corresponding to the information elements, the iterations or the action commands and stores the portions of information content for use as at least one of a computer program and a data file.

2. The apparatus of claim 1, wherein the information elements of the physical objects are assignable by the user.

3. The apparatus of claim 1, wherein the information element of a physical object is altered when the user manipulates that physical object.

4. The apparatus of claim 1, wherein the manipulations of the physical object include picking up the physical object, putting down the physical object, sliding the physical object and touching the physical object to another physical object.

5. The apparatus of claim 1, wherein the at least one sensor comprises a reference grid that senses movement of objects about the grid.

6. The apparatus of claim 1, wherein the sensor is a camera.

7. The apparatus of claim 1, wherein the physical objects actively participate in the observation.

8. The apparatus of claim 7, wherein the physical objects transmit a signal to the sensor.

9. The apparatus of claim 1, wherein each of the information elements of each of the physical objects represents a variable or a programming statement element or operator, and the information content is program code having a syntax and semantics.

10. The apparatus of claim 1, wherein the physical space is a physical symbolic representation.

11. The apparatus of claim 10, wherein the physical symbolic representation represents people, places or things.

12. The apparatus of claim 10, wherein the physical symbolic representation is used to create a narration of an event.

13. The apparatus of claim 10, wherein the physical symbolic representation is a logical situation.

14. The apparatus of claim 1, wherein the at least one sensor is a physical switch-based system.

15. The apparatus of claim 1, wherein the physical objects reassignably represent at least one of an information element, an iteration and an action command.

16. A method for generating computer programs, comprising:
   placing a plurality of physical objects into a physical space, each object representing at least one of an information element, an iteration and an action command;
   physically manipulating at least one of the plurality of physical objects in the physical space;
   generating electric signals based on the physical manipulations and the at least one of the information element, the iteration and the action command of each at least one manipulated physical object; and
   generating and storing for use as at least one of a computer program or data file, information content based on the information elements, the iterations or the action commands and the observed physical manipulations represents by the electric signals.

17. The method of claim 16, wherein the information elements are predetermined.

18. The method of claim 16, wherein physically manipulating comprises:
   selecting at least a first one of the plurality of physical objects, the first physical object having at least one predetermined information element; and
   repositioning the selected first physical object in the physical space.

19. The method of claim 18, wherein physically manipulating comprises:
   selecting a second one of the plurality of physical objects, the second physical object having at least one predetermined information element; and
   repositioning the second object in the physical space.

20. The method of claim 19, wherein repositioning of one of the first and second objects changes the at least one predetermined information element of that object.

21. The method of claim 16, further comprising generating an external representation corresponding to the physical manipulations.

22. The method of claim 21, wherein generating the external representation comprises generating and outputting an image to a visual display device.

23. The method of claim 16, wherein:
   placing the physical objects in the physical space assigns at least one information element to the physical objects; and
   relationships between the objects are formed based on relative locations of the physical objects within the physical space.

24. The method of claim 16, wherein each of the information elements of each of the physical objects represents a variable or a programming statement element or operator, and the information content is program code having a syntax and semantics.

25. The method of claim 16, further comprising:
   a start operation that begins the observation of the physical manipulations; and
   a stop operation that ends the observation of the physical manipulations.

* * * * *